Patented Dec. 2, 1952

2,620,302

UNITED STATES PATENT OFFICE 2,620,302

LUBRICATING OIL COMPOSITIONS

Oliver L. Harle, Berkeley, Calif., assignor to California Research Corporation, San Francisco, Calif., a corporation of Delaware No Drawing. Application November 18, 1950, Serial No. 196,527

11 Claims. (Cl. 252—33.6)

The present invention relates to the preparation of novel and superior lubricating oil compositions. More particularly, the invention has to do with the preparation of lubricating oil compositions based on polyoxyalkylene polymeric material, such as polymerized 1,2-propylene oxide, said compositions being suitable for crankcase use in internal combustion engines.

Polymeric mixtures having the polymeric structural configuration

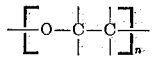

have hitherto been proposed as synthetic lubricants. These materials are prepared from the alkylene oxides, such as ethylene oxide, 1,2-propylene oxide, the butylene oxides and higher homologs and mixtures thereof, and the corresponding alkylene glycols. The resulting products may be polyoxyalkylene diols or polyalkylene glycol derivatives in which one or both of the terminal hydroxyl groups have been removed either during the polymerization reaction or subsequently thereto, as by etherification or esterification, to yield mono- or di-ether or mono- or di-ester groups, or combinations of such terminal groups, whereby certain desirable properties are imparted to the final polymeric mixture.

For example, U. S. Patent No. 2,448,664 describes the preparation of a polyoxypropylene polymeric mixture according to the equation

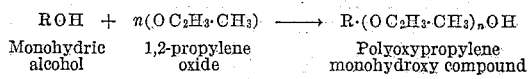

Monohydric alcohol    1,2-propylene oxide    Polyoxypropylene monohydroxy compound Other patents cover polyoxypropylene derivatives of the foregoing monohydroxy compound in which the terminal hydroxyl group has been etherified or esterified. These materials are alleged to be useful as synthetic lubricants.

Although polymeric compounds prepared from the above-mentioned epoxides and glycols have certain desirable properties, such as good viscosity indices, they possess the serious drawback of being highly sensitive to oxidation. Upon oxidation these polymeric materials depolymerize, with consequent loss in viscosity, to form undesirable acidic compounds and volatile materials, which latter materials are eventually lost from the lubrication system. An attempted solution of the problem has been the use of certain complex aromatic amines, the more common oxidation and corrosion inhibitors employed in hydrocarbon lubricating oils having been ignored because regarded as being ineffective with polyalkylene glycol type systems.

An object of the invention is to impart resistance to oxidation to polymeric mixtures prepared from alkylene oxides and glycols.

Another object of the invention is to prepare novel and superior lubricating oil compositions.

Other objects and advantages of the invention will be apparent from the ensuing description of the invention.

Broadly, I have found that polymeric material of the type hereinabove described may be substantially improved by the incorporation therein of stabilizing agents of certain specific classes in the presence of an additional mineral oil component. The resulting novel compositions, as hereinafter will more fully be shown, are unpredictably stable against oxidation. More specifically, my invention comprises polyoxyalkylene polymeric material as the basic component, mineral oil, and, soluble in the mixture of polymeric material and mineral oil, a metal phenate, hereinafter to be more fully described. The presence of a fourth component or additive, namely, a metal salt of a dithiocarbamic acid, soluble in the mixture, gives rise to a finished composition of even greater oxidation stability.

I have found that in the absence of the mineral oil component, the stabilizing agent metal phenate is substantially without effect. Also, the mere admixture of mineral oil and polymeric material, in the absence of the stabilizing agents, results in a composition having substantially no resistance to oxidation. Similarly, I have found that the desirable results achieved are specific to metal phenates and dithiocarbamates. For example, while such materials as amines, alkyl polysulfides, thioethers and the like are often regarded as the equivalents of the dithiocarbamates, they are substantially ineffective for purposes of the present invention. Likewise, while such materials as basic sulfonates, phosphonates, and other basic materials are often used interchangeably with the metal phenates, for purposes of the present invention they are substantially without effect.

The polymeric materials contemplated by the present invention may be prepared according to conventional methods. For example, U. S. Patent No. 2,448,664 describes the preparation of poly-oxypropylene monohydroxy compounds by the addition of 1,2-propylene oxide to a monohydroxy aliphatic alcohol to produce a polymeric mixture of lubricating oil viscosity ranging in molecular weight from around 500 up to 2,000 and higher. The preparation of copolymeric polyalkylene oxide mixtures from ethylene oxide and propylene oxide are described in U. S. Patent No. 2,425,755. Polyoxyalkylene diols are described in U. S. Patent 2,480,185, while diethers of polyoxyalkylene diols are taught in U. S. Patent No. 2,520,612. Preferably employed in accordance with the invention is the diether of polyalkylene glycol or the monoether of polyalkylene glycol ester, derived most advantageously from 1,2-propylene oxide.

A convenient method of measuring the resistance to oxidation possessed by the compositions prepared in accordance with the invention is the use of the apparatus and procedure described in Industrial and Engineering Chemistry, vol. 28, page 26 (1936), wherein the rate of oxygen absorbed at constant pressure by a definite weight of oil is regarded as a measure of the oxidative stability of the oil. According to this procedure, the oil sample is placed in an absorption cell, provided in the bottom with a fine fitted-glass filter to disperse the oxygen stream, circulating through the system at a constant rate, into fine bubbles. In obtaining the data hereinbelow appearing, the following modified apparatus and procedure were employed:

The oxidation or absorption cell is constructed of a large glass tube with the head portion having a connection for introducing oxygen, an annular space surrounding the upper end of the tube and a fitting for a removable high speed glass stirrer. The annular space contains potassium hydroxide pellets for the removal of water, carbon dioxide, volatile aldehydes, etc. The lower portion of the cell which contains the tested sample is immersed in an oil bath at a temperature of about 340° F. During the test, the oil sample is rapidly agitated by means of a high speed stirrer and is kept under a pressure of about 1 atmosphere of pure oxygen, the volume of oxygen added being automatically recorded. The time in hours required for 100 grams of oil to absorb 1200 cc. of oxygen is called the "Induction Period" (I. P.), and represents the point at which the sample begins to absorb oxygen or oxidize.

The data tabulated below were obtained employing the apparatus and procedure described above. In these tests the polymer employed was polypropylene glycol monoisooctyl ether monoacetate having a molecular weight of about 550; the mineral oil was a spray oil, more specifically, a distillate cut of about 120 SSU at 100° F., obtained from naphthenic crude, solvent- and acid-treated with $SO_2$ and $H_2SO_4$, respectively, to yield a finished oil having a viscosity of about 87 SSU and 37.3 SSU at 100° F. and 210° F., respectively, a flash of 330° F. (Cleveland open cup), an aniline point of 192, and an unsulfonated residue of 91; the metal phenate was a sulfurized calcium cetyl phenate, prepared in accordance with U. S. Patent No. 2,360,302 to Dorr H. Etzler and Bruce B. Farrington; and the dithiocarbamate, zinc di-n-butyldithiocarbamate. The mineral oil was present in equal proportions by weight of the polymer, the metal phenate and dithiocarbamate were present in about 1.5% and 0.2% by weight of the finished composition, respectively.

| Tests | Induction Period (Hours) |
|---|---|
| 1. Polymer | 0.0 |
| 2. Mineral Oil | >24 |
| 3. Polymer+Mineral Oil | 0.0 |
| 4. Polymer+Phenate | 0.0 |
| 5. Polymer+Dithiocarbamate | 0.0 |
| 6. Polymer+Phenate+Mineral Oil | 1.1 |
| 7. Polymer+Dithiocarbamate+Mineral Oil | 0.25 |
| 8. Polymer+Phenate+Dithiocarbamate | 1.5 |
| 9. Polymer+Phenate+Dithiocarbamate+Mineral Oil | 16.6 |

In analyzing the foregoing data, it is noted that the addition of mineral oil having a good I. P. (Test #2) to polymer having a zero I. P. (Test #1) resulted in a mixture having the oxidation characteristics of the polymer, that is, a zero I. P. (Test #3). Addition of either phenate or dithiocarbamate to polymer likewise results in compositions of zero I. P. (Tests #4 and 5). On the other hand, addition of both phenate and dithiocarbamate to the polymer (Test #8) resulted in a mixture having a substantial I. P., while the addition of phenate and mineral oil to the polymer (Test #6) also resulted in a composition of improved I. P. Such mixtures would be useful as lubricants wherein a moderate I. P. is usually sufficient, such as, for example, turbine oils. In Test #9 it is shown that the addition of mineral oil, phenate and dithiocarbamate to the polymer yields a composition having an outstandingly superior I. P., as a result of which compositions prepared in accordance therewith may be employed as lubricants of which good oxidative stability is required, for example, when employed as crank-case lubricants.

In place of the sulfurized polyvalent metal alkyl phenate employed in the above tests, other basic materials of similar nature containing an aromatic nucleus can be employed in accordance with the invention. These metal phenates may be characterized as metal salts, wherein the metal is preferably polyvalent, of alkyl substituted phenol and cresols containing 4 to 20 carbon atoms in one or more alkyl groups. Polyvalent metal salts of bis-(alkyl phenol) sulfides and disulfides containing 4 to 20 carbon atoms in one or more alkyl groups are advantageously employed in accordance with the invention. The preferred metal phenate material is a sulfurized polyvalent metal alkyl phenate of 4 to 20 carbon atoms in one or more alkyl groups.

Suitable metal phenates contemplated by the invention are the dialkyl diphenol sulfides described in U. S. Patent No. 2,195,539; the oil-soluble or oil-miscible alkyl-substituted aryl metal oxides of U. S. Patent No. 2,197,833; the phenates formed from high molecular weight alkyl phenols of U. S. Patent Nos. 2,211,972 and 2,228,661; the alkaline earth metal phenates of U. S. Patent No. 2,228,654; the alkyl phenol thioethers and disulfides of U. S. Patent No. 2,230,542; the metal phenates of U. S. Patent No. 2,410,652, which are metal salts of the condensation product of a low-molecular weight aldehyde with a hydrocarbon-substituted phenol; the sulfurized phenates of U. S. Patent No. 2,360,302. Metal salts of naphthols can also be used.

The amount of metal phenate present in the compositions of the invention ranges from about 1% to about 10% by weight of the finished composition. The preferred amount is between about 2% and 5% by weight of the finished composition.

The metal salts of dithiocarbamic acids contemplated by the invention may be represented by the formula

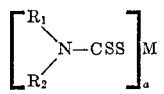

wherein $R_1$ and $R_2$ are hydrogen or oil-solubilizing organic groups, at least one R being an oil-solubilizing organic group; S is sulfur; M is a metal; and $a$, an integer corresponding to the valence of metal M. Preferably, the metal dithiocarbamate is one in which both $R_1$ and $R_2$ are groups of hydrocarbon structure, such as polyvalent metal diphenyl dithiocarbamate, polyvalent metal dialkyl dithiocarbamates, etc.

Examples of dithiocarbamates are calcium, lead, zinc and cadmium dibutyl dithiocarbamates; zinc dicetyl dithiocarbamate; zince methyl octyl dithiocarbamate; zinc monocetyl dithiocarbamate; zinc butyl amylphenyl dithiocarbamate; calcium dicyclohexylphenyl dithiocarbamate; calcium, zinc, cadmium dithiocarbamates, as described in U. S. Patent No. 2,363,012; zinc dibenzyl dithiocarbamate; and zinc diamyl piperidyl dithiocarbamate.

Additional examples of metal salts of dithiocarbamic acids appear in U. S. Patents 2,356,661, 2,265,851, 2,343,393, 2,160,851, 2,371,319, 2,382,781 and 2,201,258.

In general, the amount of metal dithiocarbamate employed in accordance with the invention ranges from about 0.1% to 1% of the finished composition. The preferred amount is between about 0.2 and 0.5% by weight of the finished composition.

As stated, polyvalent metal phenates and polyvalent metal dithiocarbamates are preferred. Sodium, potassium and lithium phenates and/or dithiocarbamates can be used, however, especially where likelihood of contact with water is small. Preferred polyvalent metals are the alkaline earth metals, such as magnesium, calcium, strontium and barium; zinc, cadmium, aluminum and tin. Sulfurized alkaline earth metal phenates, especially calcium and barium are preferred, and zinc dithiocarbamates are most advantageously employed.

The lubricating oil additive can be any mineral or hydrocarbon lubricating oil suitable as a crankcase lubricant for internal combustion engines. It can be a straight mineral oil or a distillate derived from paraffinic, naphthenic, asphaltic or mixed base crudes. Moreover, the oil may be an oil refined by conventional methods, such as solvent- or acid-treated hydrocarbon oils or mixtures thereof. Also satisfactory for purposes of the present invention are white oils notoriously unstable toward oxidation, as well as saturated or fully hydrogenated synthetic oils, such as those derived from the polymerization of olefins or the Fischer-Tropsch process. Various blended oils are also contemplated by the invention.

The amount of hydrocarbon oil present in the compositions contemplated by the invention ranges from about 25 to 75 per cent by weight of the finished composition. Expressed in another way, since hydrocarbon oil and polymer form a mixture representing a major proportion of the final composiiton, the amount of hydrocarbon oil can be fixed in terms of the polymer; that is, the amount of hydrocarbon oil present in the final composition will be by weight, about one-third to about three-fold the amount of polymer, equal amounts of each being preferred.

As a further illustrative example of the invention about 48.3% of medicinal white oil, complying with U. S. P. requirements, and having a viscosity of about 107 SSU at 100° F. and a zero Induction Period, was added to about 50% polypropylene glycol monobutylether having an average molecular weight of about 500. To the resulting blend there were then added about 1.5% of sulfurized calcium cetyl phenate and about 0.2% of zinc di-n-butyl-dithiocarbamate. The Induction Period of the finished composition was 15 hours. This composition was suitable as a crankcase lubricant.

Another composition comprising 48.3% and 50%, respectively, of the spray oil and polymer employed in obtaining the data tabulated above, about 1.5% of barium cetyl phenate, and about 0.2% of zinc di-n-butyldithiocarbamate had an Induction Period of 6 hours.

A further example of the invention is as follows: To a blend of 48.3% spray oil and 50% polymer, both the same materials as described in obtaining the data tabulated above, there were added about 1.5% of sulfurized calcium cetyl phenate, also as hereinbefore described, and about 0.2% of zinc diethyldithiocarbamate. The Induction Period of the finished composition was 12 hours.

Another composition was made up employing 73.3% and 25%, respectively, of spray oil and of polymer of the type described in the preceding example, about 0.2% of zinc di-n-butyldithiocarbamate, and about 1.5% of sulfurized calcium cetyl phenate. The Induction Period of the finished composition was 25 hours. A mixture of spray oil and polymer in the same proportions in the absence of metal phenate and dithiocarbamate gave an Induction Period of zero.

A composition prepared similarly to the preceding example, except that it contained 25% of spray oil and 73.3% of polymer had an Induction Period of 3.5 hours.

Obviously, many modifications and variations of the invention as hereinbefore set forth may be made without departing from the scope and spirit thereof, and therefore only those limitations should be imposed as are indicated by the appended claims.

I claim:

1. A lubricating oil composition of 1,2-polyalkylene glycol polymeric material having improved resistance to oxidation, comprising a major proportion of a mixture of 1,2-polyalkylene glycol polymeric material of lubricating oil viscosity normally susceptible to oxidation and hydrocarbon oil in an amount, by weight, of said polymeric material of about one-third to about three-fold the amount of said polymeric material, and, soluble in said mixture, about 0.1% to about 1% of zinc dithiocarbamate and about 1% to about 10% of an alkaline earth metal salt of an alkyl-substituted phenol having at least 4 to 20 carbon atoms in at least one alkyl group.

2. Composition substantially as described in claim 1, wherein the hydrocarbon oil is mineral oil and the polymeric material is a 1,2-polyalkylene glycol having at least one terminal group selected from the class consisting of ester and ether groups.

3. Composition substantially as described in claim 2, wherein the 1,2-polyalkylene glycol is 1,2-polypropylene glycol.

4. Composition substantially as described in claim 2, wherein the zinc dithiocarbamate is a zinc n-dialkyl dithiocarbamate.

5. Composition substantially as described in claim 4, wherein the salt of the alkyl-substituted phenol is a sulfurized alkaline earth metal salt of an alkyl-substituted phenol.

6. Composition substantially as described in claim 5, wherein the alkaline earth metal is calcium.

7. A lubricating oil composition of 1,2-polyalkylene glycol polymeric material having improved resistance to oxidation, comprising a major proportion of a mixture of 1,2-polypropylene glycol polymeric material having a molecular weight between about 500 and 2000 and hydrocarbon oil in an amount, by weight, of said polymeric material of about one-third to about three-fold the amount of said polymeric material, and soluble in said mixture, about 0.1% to about 1% of zinc dithiocarbamate and about 1% to about 10% of an alkaline earth metal salt of an alkyl-substituted phenol having at least 4 to 20 carbon atoms in at least one alkyl group.

8. Composition substantially as described in claim 7, wherein the polymeric material is the monoether of 1,2-polypropylene glycol ester.

9. Composition substantially as described in claim 7, wherein the polypropylene glycol polymeric material has at least one terminal group selected from the class consisting of ester and ether groups.

10. Composition substantially as described in claim 9, wherein the salt of the alkyl-substituted phenol is a sulfurized alkaline earth metal salt of an alkyl-substituted phenol and the zinc dithiocarbamate is zinc di-n-butyldithiocarbamate.

11. Composition substantially as described in claim 10, wherein the alkaline earth metal salt of the alkyl-substituted phenol is calcium alkyl-substituted phenol.

OLIVER L. HARLE.

REFERENCES CITED

The following references are of record in the file of this patent:

UNITED STATES PATENTS

| Number | Name | Date |
|---|---|---|
| 2,406,564 | Rogers et al. | Aug. 27, 1946 |
| 2,412,903 | Miller et al. | Dec. 17, 1946 |
| 2,451,346 | McNab et al. | Oct. 12, 1948 |
| 2,510,540 | Ballard et al. | June 6, 1950 |
| 2,543,735 | Stewart et al. | Feb. 27, 1951 |

OTHER REFERENCES

"Ucon" Fluids and Lubricants (Polyalkylen Glycols and Derivatives) Carbide and Carbon Chem. Corp., New York 17, N. Y., May 31, 1948.

"Lubricating Oil Additives," Kalichevsky; Petroleum Refiner, September 1949, vol. 28, No. 9, p. 85.